(12) United States Patent
Holman et al.

(10) Patent No.: US 10,928,180 B2
(45) Date of Patent: Feb. 23, 2021

(54) FLEXIBLE DEFORMATION SENSOR

(71) Applicant: Tactual Labs Co., New York, NY (US)

(72) Inventors: David Holman, Toronto (CA); Ricardo Jorge Jota Costa, Toronto (CA); David Clark Wilkinson, Austin, TX (US); Bruno Rodrigues De Araujo, Toronto (CA); Adam Landa, Forest City, FL (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 15/943,221

(22) Filed: Apr. 2, 2018

(65) Prior Publication Data

US 2018/0306568 A1    Oct. 25, 2018

Related U.S. Application Data

(63) Continuation-in-part of application No. 15/904,953, filed on Feb. 26, 2018, now Pat. No. 10,620,696.

(60) Provisional application No. 62/488,753, filed on Apr. 22, 2017, provisional application No. 62/533,405, filed on Jul. 17, 2017, provisional application No.
(Continued)

(51) Int. Cl.
*G01B 7/24*       (2006.01)
*G01D 5/252*    (2006.01)
*G06F 3/041*    (2006.01)
*G06F 3/046*    (2006.01)
*G06F 3/01*      (2006.01)

(52) U.S. Cl.
CPC ............. *G01B 7/24* (2013.01); *G01D 5/2525* (2013.01); *G06F 3/011* (2013.01); *G06F 3/017* (2013.01); *G06F 3/046* (2013.01); *G06F 3/0414* (2013.01); *G06F 3/0416* (2013.01)

(58) Field of Classification Search
CPC ...... G01B 7/24; G01D 5/2525; G06F 3/0414; G06F 3/0416; G06F 3/046; G01L 1/22; G01L 1/127; G01N 2203/005; G01H 11/06
USPC .......................................................... 73/779
See application file for complete search history.

(56) References Cited

U.S. PATENT DOCUMENTS

5,429,006 A * 7/1995 Tamori .................... G06F 3/045
                                                            382/124
5,521,336 A * 5/1996 Buchanan ............... G06F 3/045
                                                            178/18.03
(Continued)

*Primary Examiner* — Octavia Hollington
(74) *Attorney, Agent, or Firm* — Adam Landa (57) ABSTRACT

A controller for sensing deformation including a sensor structure having a deformable conductor and another conductor (which may also be deformable). The deformable conductor may be made out of a flexible non-fluid material (e.g., rubber) or a conductive fluid. The deformable conductor may be deformed by the deformation of the sensor structure or by other forces. The sensor comprises circuitry to drive and sense signals on interacting pairs of conductors (the deformable conductor or the other conductor can act as the drive side, or as the sense side). Sense signals are processed to analyze deformation of the deformable conductor, and deformation of the sensor structure. Where the sensor is deployed proximate to human skin, deformation and changes in deformation may be used to correlate or infer a body position, movement or pose.

10 Claims, 9 Drawing Sheets

Related U.S. Application Data

62/588,267, filed on Nov. 17, 2017, provisional application No. 62/588,148, filed on Nov. 17, 2017, provisional application No. 62/621,117, filed on Jan. 24, 2018.

(56) References Cited

U.S. PATENT DOCUMENTS

| | | | | |
|---|---|---|---|---|
| 6,234,031 B1* | 5/2001 | Suga | G06K 9/0002 73/862.474 |
| 7,609,178 B2* | 10/2009 | Son | G06F 3/016 200/600 |
| 7,663,607 B2* | 2/2010 | Hotelling | G06F 3/0416 345/173 |
| 7,800,362 B1* | 9/2010 | Ogawa | G01L 1/14 324/207.15 |
| 8,421,890 B2* | 4/2013 | Benkley, III | G06K 9/0002 348/294 |
| 8,669,755 B2* | 3/2014 | Kato | G01B 7/287 204/406 |
| 8,698,769 B2* | 4/2014 | Coulson | G06F 3/044 345/173 |
| 8,780,074 B2* | 7/2014 | Castillo | G06F 3/044 345/174 |
| 9,069,411 B2* | 6/2015 | Chang | G06F 3/0418 |
| 9,552,089 B2* | 1/2017 | Lukanc | G06F 3/0412 |
| 9,557,845 B2* | 1/2017 | Shahparnia | |
| 9,851,828 B2* | 12/2017 | Richards | G01L 1/205 |
| 9,983,744 B2* | 5/2018 | Son | G06F 3/044 |
| 10,048,775 B2* | 8/2018 | Shahparnia | G06F 3/03545 |
| 10,386,224 B2* | 8/2019 | Shim | B25J 19/028 |
| 10,401,241 B2* | 9/2019 | Madden | G06F 3/0414 |
| 2015/0130754 A1* | 5/2015 | Yairi | G06F 3/044 345/174 |
| 2018/0024667 A1* | 1/2018 | Moseley | G06F 3/044 |
| 2018/0059819 A1* | 3/2018 | Moseley | G06F 3/016 |

\* cited by examiner

FLEXIBLE DEFORMATION SENSOR

This application is related to and claims the benefit of U.S. Provisional Patent Application No. 62/488,753, entitled "Heterogenous Sensing Apparatus and Methods" filed on Apr. 22, 2017; U.S. Provisional Patent Application No. 62/533,405, entitled "Apparatus and Methods for Enhancing Digit Separation and Reproduction" filed on Jul. 17, 2017; U.S. Provisional Patent Application No. 62/588,267, entitled "Sensing Controller" filed on Nov. 17, 2017; and U.S. Provisional Patent Application No. 62/588,148, entitled "Systems and Methods for Infusion Range Sensor" filed on Nov. 17, 2017; U.S. Provisional Patent Application No. 62/621,117, entitled "Matrix Sensor with Receive Isolation," filed Jan. 24, 2018; and is a Continuation-in-part of U.S. patent application Ser. No. 15/904,953, entitled "Apparatus and Method for Sensing Deformation," filed on Feb. 26, 2018, the contents of all the aforementioned applications hereby incorporated herein by reference.

FIELD

The disclosed apparatus and methods relate in general to the field of sensors, and in particular to sensors that are sensitive to deformation.

BACKGROUND

In recent years virtual reality (VR) and augmented reality (AR) have become increasingly popular as computational power and immersive possibilities become more common.

Generally, while systems and methods offer ways to interact with VR and AR environments, frequently the mechanism for interacting with these types of environments detracts from the immersive nature.

What is needed are sensors that provide detailed information relative to position, movement or interaction, without detracting from the immersiveness of the overall system.

BRIEF DESCRIPTION OF THE DRAWINGS

The foregoing and other objects, features, and advantages of the disclosure will be apparent from the following more particular description of embodiments as illustrated in the accompanying drawings, in which reference characters refer to the same parts throughout the various views. The drawings are not necessarily to scale, emphasis instead being placed upon illustrating principles of the disclosed embodiments.

DETAILED DESCRIPTION

Generally the following description relates to sensors that comprise deformable sensing elements. In an embodiment, the deformable elements are deformed in response to force. In an embodiment, the force is a mechanical force (e.g., pressure, tension, stress, strain, torque). In an embodiment, the force is a magnetic or electromagnetic force. In an embodiment, a combination of forces may deform a deformable element. In an embodiment, one or more deformable elements are embedded within a sensor that detects information concerning interaction with the sensor as a result of the deformation of one or more deformable elements. In an embodiment, one or more deformable elements are embedded within a wearable sensor that detects information concerning pose as a result of the deformation of one or more deformable elements. In an embodiment, deformation of a deformable element is inferred based on the change in the electrical relationship with another element. In an embodiment, a deformable element is used to transmit an electrical signal and another element is used to receive that signal, and deformation is inferred based on changes in the received signal. In an embodiment, a deformable element is used to receive an electrical signal and another element is used to transmit that signal, and deformation is inferred based on changes in the received signal.

This application relates to user interfaces such as found in U.S. Provisional Patent Application No. 62/621,117, entitled "Matrix Sensor with Receive Isolation," The entire disclosure of that application, and the applications incorporated therein by reference, are incorporated herein by reference. The presently disclosed systems and methods provide for designing, manufacturing sensors that employ a multiplexing scheme based on orthogonal signaling such as but not limited to frequency-division multiplexing (FDM), code-division multiplexing (CDM), or hybrid modulation techniques that can combines multiple schemes such as FDM and CDM methods. References to frequency herein could also refer to other orthogonal signal bases. As such, this application incorporates by reference Applicants' prior U.S. patent application Ser. No. 13/841,436, filed on Mar. 15, 2013 entitled "Low-Latency Touch Sensitive Device" and U.S. patent application Ser. No. 14/069,609 filed on Nov. 1, 2013 entitled "Fast Multi-Touch Post Processing." These applications contemplate FDM, CDM, or hybrid sensors which employ principles which may be used in connection with the presently disclosed sensors.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time. However, where the further limitation that the second time is after the first time is presented in the claim, the context would require reading the first time and the second time to be unique times.

Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency—e.g., the first frequency being 10 Mhz and the second frequency being 10 Mhz; or could be different frequencies—e.g., the first frequency being 10 Mhz and the second frequency being 11 Mhz. Context may dictate otherwise, for example, where a first and a second frequency are further limited to being orthogonal to each other in frequency, in which case, they could not be the same frequency.

In various embodiments, the present disclosure is directed to motion sensing controllers, and methods for designing, manufacturing and operating motion controllers (e.g., hand movement controllers), and in particular controllers using signals to determine an amount of deformation of a surface in order to model motion of a body part. Throughout this disclosure, various controller shapes and sensor patterns are used for illustrative purposes. Although example compositions and/or geometries are disclosed for the purpose of illustrating the invention, other compositions and geometries will be apparent to a person of skill in the art, in view of this disclosure, without departing from the scope and spirit of the disclosure herein.

Generally, the sensing methods described herein sense interaction between pairs of conductors, where at least one is used for transmitting a signal, and at least one is used for receiving a signal. In an embodiment, either sides (each of the two conductors) is used for transmitting or receiving. In an embodiment, both sides (each of the two conductors) are used for both transmitting and receiving. In an embodiment, both sides (each of the two conductors) are used for both transmitting and receiving simultaneously. When used for transmitting, the conductor is operatively connected to a signal generator. When used for receiving, the conductor is operatively connected to a signal receiver. The term antenna is often used interchangeably with the term conductor when referring to the interacting pairs. Specifically, where a signal is transmitted on one conductor/antenna, a field is created between that conductor/antenna and one or more other conductors/antennas (e.g., at least one receiver conductor—but there can be many). The field created can be disturbed by certain kinds of interactions, e.g., the presence of human body parts or other objects. Sensing is accomplished by measuring small changes in the field. In an embodiment, changes in the magnitude of a signal received at the receiver are measured and used to derive sensing information. In an embodiment, changes in the phase of a signal received at the receiver are measured and used to derive sensing information. In an embodiment, sensing relies on fusion of multiple measurements (e.g., magnitude and phase), including measurements made by other sensors. It will be apparent to a person of skill in the art in view of this disclosure that although the elements that operatively join the flexible conductors/antennas described herein with the driving or receiving circuitry (e.g., signal generators or signal receivers) may be conductive, may be flexible, and may even be referred to as a conductor, it does not refer to the conductor/antenna for sensing interactions.

Throughout this disclosure, the term "deformation event" or other descriptors may be used to describe events or periods of time during which a deformation of a conductor (e.g., antenna) takes placed. The term "deformation" when referring to a conductor refers to a change in shape of the conductor. Generally, deformation refers to a change in shape of one conductor (e.g., antenna) as it relates to another.

The conductor deformation can be caused by human-machine interaction such as user movement. In an embodiment, the resulting conductor shape itself may be used to identify pose, e.g., a body position or hand position. In an embodiment, the change in conductor shape may be used to identify pose, e.g., a body position or hand position. In an embodiment, a "deformation" or "deformation event" may be detected, processed, quantified and/or supplied to downstream computational processes with very low latency, e.g., on the order of ten milliseconds or less, or on the order of less than one millisecond.

The term "controller" as used herein is intended to refer to a physical object that may provide the function of human-machine interface. In an embodiment, the controller is a wristband. In an embodiment, the controller is able to detect movements of a hand through deformation of conductors in the wristband. In an embodiment, the controller is able to detect the movements of a hand by sensing such movements directly. See, e.g., U.S. Provisional Patent Application No. 62/473,908, entitled "Hand Sensing Controller," filed Mar. 20, 2017; U.S. Provisional Patent Application No. 62/488,753, entitled "Heterogenous Sensing Apparatus and Methods" filed on Apr. 22, 2017; and U.S. Provisional Patent Application No. 62/588,267, entitled "Sensing Controller" filed on Nov. 17, 2017. In an embodiment, the controller may provide position and/or movement of other body parts through the detection of deformation. The deformation may provide information regarding the surface areas proximate to and/or associated with the body part and/or function, e.g., the articulation of the bones, joints and muscles of the wrist area and how it translates into the position and/or movement of the hand; the articulation of the bones, joints and muscles of the ankle area and how it translates into position and/or movement of the foot; the vibration and movement of the vocal cords and how it translates into speech; the detection of a heartbeat; the detection of pulse.

The apparatuses discussed herein, which may be controllers, use first conductors and second conductors. The first conductors and second conductors can be transmitters, receivers or ground. However, it should be understood that whether the first conductor (or second conductor) is a transmitter, a receiver, or ground depends on context and the embodiment. In an embodiment, the transmitters and receivers for all or any combination of patterns are operatively connected to a single integrated circuit (IC) capable of transmitting and receiving the required signals. In an embodiment, the transmitters and receivers are each operatively connected to a different integrated circuit capable of transmitting and receiving the required signals, respectively. In an embodiment, the transmitters and receivers for all or any combination of the patterns may be operatively connected to a group of integrated circuits, each capable of transmitting and receiving the required signals, and together sharing information necessary to such multiple IC configuration. In an embodiment, where the capacity of the integrated circuit (i.e., the number of transmit and receive channels) and the requirements of the patterns (i.e., the number of transmit and receive channels) permit, all of the transmitters and receivers for all of the multiple patterns used by a controller are operated by a common integrated circuit, or by a group of integrated circuits that have communications therebetween. In an embodiment, where the number of transmit or receive channels requires the use of multiple integrated circuits, the information from each circuit is combined in a separate system. In an embodiment, the separate system comprises a Graphics Processing Unit (GPU) and software for signal processing.

In an embodiment, at least one of the first and second conductors is deformable. By "deformable" it is meant that the shape of the first or second conductor changes, for example, but not limited to, bending, twisting, compressing, expanding, lengthening, shortening, and/or folding. The deformability of at least one of the first and second conductors permits movement of the at least one of the first and second conductors relative to another of the first and second conductors. For example, a first conductor can be deformable and move relative the second conductor. The first conductor may be functioning as a transmitter and the second conductor may be functioning as a receiver. In this example, the second conductor receives signals that can be used to determine the amount of deformation that has occurred. This deformation is then used to extrapolate information regarding the user, for example, hand position, ankle position, chest motion, etc.

Figure 1:
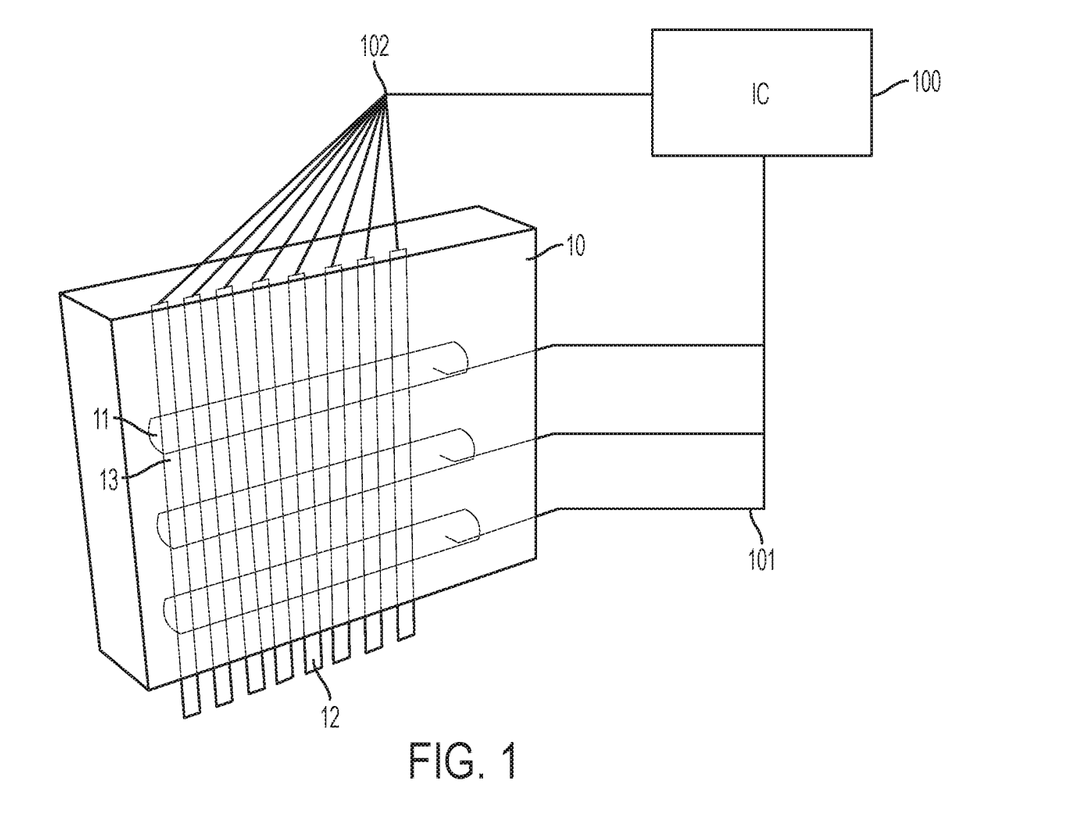
FIG. 1 shows a schematic diagram of a sensor structure that has conductors that are deformable.

Turning to FIG. 1, an embodiment illustrating deformable conductors is shown. Shown in FIG. 1 is an exemplary sensor structure 10 portion comprising a plurality of first conductors 11 and a plurality of second conductors 12. The first conductors 11 and/or second conductors 12 are operably connected to integrated circuit 100. In an embodiment, the sensor structure 10, first conductor 11, second conductor 12 and integrated circuit 100 form an apparatus that is used as a controller. In an embodiment, the formed apparatus is a device for measuring a function of a body part. In an embodiment, the formed apparatus is a device for determining position, movement and/or another characteristic of a body part.

In an embodiment, the sensor structure 10 is a portion of a wearable, such as a wristband, ankle band, arm band, headband, neck gaiter, ring, etc. In an embodiment, sensor structure 10 is a portion of a wearable, such as pants, shoes, socks, shirts, hats, goggles, gloves, gauntlets, etc. In an embodiment, sensor structure 10 is embodied in a film that is secured on a user. In an embodiment, sensor structure 10 is a portion of a wearable that is secured directly on a user's skin. In an embodiment, sensor structure 10 is a portion of a wearable that may be secured to a user directly on the skin via an adhesive.

In an embodiment, the sensor structure 10 is a portion of an automotive system that requires sensing, e.g., a car seat, steering wheel, console, dashboard, interior door, tire, carpet, etc. In an embodiment, the sensor structure 10 is a portion of a robotic system that requires sensing, e.g., control arm, etc. In an embodiment, the sensor structure 10 is a portion of another system that requires sensing.

In an embodiment, sensor structure 10 is a made of material that is an elastomeric. In an embodiment, sensor structure 10 is a made of material that is a rubber. In an embodiment, sensor structure 10 is a made of material that comprises silicone. In an embodiment, sensor structure 10 is made of material that is a fabric. In an embodiment, sensor structure 10 is made of an elastic material. In an embodiment, sensor structure 10 is made of a material that has cavities 13 formed therein. In an embodiment, sensor structure 10 is made of a material that has a different stiffness than either first conductor 11 or second conductor 12 or both. In an embodiment, the sensor structure 10 comprises at least two portions, each having a different Young's modulus (E). In an embodiment, the sensor structure 10 comprises two portions, a first portion supporting the first conductors 11 and a second portion supporting the second conductors 12. In an embodiment, separate portions of the sensor structure 10 have a different rigidity or stiffness. In an embodiment, separate portions of the sensor structure 10 have a different E value. In an embodiment, separate portions of the sensor structure 10 can move in relation to each other.

Still referring to FIG. 1, the first conductors 11 are located within the sensor structure 10. In FIG. 1, the first conductors 11 are shown running parallel to each other. In an embodiment, the first conductors 11 have a parallel orientation to one another when not undergoing a deformation or deformation event. In an embodiment, the first conductors 11 are not arranged in parallel to one another. In an embodiment, the first conductors 11 extend in a lengthwise direction perpendicular to the direction the second conductors 12 extend in a lengthwise direction. In an embodiment, the first conductors 11 extend in a lengthwise direction parallel to the direction the second conductors 12 extend in a lengthwise direction, e.g., see FIG. 3. In an embodiment, the first conductors 11 are arranged in a variety of directions with respect to one or more of the second conductors 12. In an embodiment, the first conductors 11 may be arranged in a distribution that is random. In an embodiment, the first conductors 11 are arranged in an ordered distribution. In an embodiment, the first conductors 11 are arranged in a predetermined configuration. It should be understood that the orientation of the first conductors 11 with respect the second conductors 12 may vary and many different configurations will be apparent to a person of skill in the art in view of this disclosure.

In an embodiment, the first conductor 11 comprises a conductive liquid material. In an embodiment, the first conductor's the liquid material is retained by an outer barrier which contains the liquid. In an embodiment, the first conductor's the liquid material is retained by a flexible outer barrier which contains the liquid. In an embodiment, the sensor structure 10 contains the liquid in a space therein. The term liquid as used when referring to the conductive liquid material refers to material being flexible (e.g., liquid, semi-liquid, gelatinous or molten form) in environments where the sensor structure 10 is contemplated to be used. In an embodiment, the conductive liquid material used in the first conductor 11 is liquid at room temperature. In an embodiment, the conductive liquid material used in the first conductor 11 maintains its liquid form due to other mechanisms located on the sensor structure 10. In an embodiment, the conductive liquid material used in the first conductor 11 maintains its liquid form due to other mechanisms located on the sensor structure 10 such as, for example, heating elements, pressurized cavities, etc. In an embodiment, the conductive liquid material used in the flexible conductor is gallium. In an embodiment, the flexible conductor is made from gallium. In an embodiment, the flexible conductor comprises gallium. In an embodiment, the flexible conductor comprises a gallium-based alloy. In an embodiment, the flexible conductor is made from a fluid which can be urged or shaped by magnetism or a magnetic field, e.g., (a ferrofluid, magnetorheological fluid or another fluid containing a magnetic suspension). As used hereinafter, the term magnofluid will be used to refer to a fluid which can be urged or shaped by a magnetism or a magnetic field, including, without limitation, a ferrofluid, magnetorheological fluid or another fluid containing a magnetic suspension. In an embodiment, the flexible conductor comprises a magnofluid (i.e. a fluid containing a magnetic suspension). In an embodiment, the flexible conductor is made from conductive eutectic mixture. In an embodiment, the flexible conductor comprises conductive eutectic mixture.

In an embodiment, the first conductor 11 is formed with a conductive liquid material formed by filling a cavity 13 formed within the sensor structure 10. In an embodiment, movement of the conductive liquid material within the cavity 13 provides the first conductor 11 with the ability to deform. In an embodiment, deformation of the sensor structure 10 or a portion thereof, will cause the cavity 13 to expand, contract, bend, flatten, etc., causing changes in the shape of the first conductor 11. In an embodiment, changes in the shape of the first conductor 11 will cause measurable changes in the electrical interaction of interacting pairs of conductors. In an embodiment, measurements corresponding to the changes in the electrical interaction of interacting pairs of conductors can be used to infer a shape change of a first conductor. In an embodiment, measurements corresponding to the changes in the electrical interaction of interacting pairs of conductors can be used to infer deformation of the first conductor. In an embodiment, measurements corresponding to the changes in the electrical interaction of interacting pairs of conductors can be used to infer change in shape of the sensor structure 10. In an embodiment, measurements corresponding to the changes in the electrical interaction of interacting pairs of conductors can be used to determine a deformation event.

In an embodiment, the first conductor 11 is formed as a separate structure than the sensor structure 10 (i.e. without the use of cavities 13). The separate structure is filled with conductive liquid material and then embedded or placed within the sensor structure 10.

In an embodiment, the cavity or outer barrier associated with a conductive liquid antenna is fully filled with the conductive liquid material, without additional space for air or other gasses or materials. In an embodiment, the cavity or outer barrier associated with a conductive liquid antenna is less than fully filled with the conductive liquid material, leaving additional space for air or other gasses or other materials. In an embodiment, the cavity or outer barrier associated with a conductive liquid antenna is filled with the conductive liquid material and with a substantially nonconductive liquid that is immiscible therewith. the cavity or outer barrier associated with a conductive liquid antenna is filled with the conductive liquid material and with a substantially nonconductive liquid that is immiscible therewith, such that the conductive liquid material deforms with movement, and in steady state with respect to gravity.

In an embodiment, the first conductor 11 is formed by partial filling of the cavity or outer barrier, permitting the conductive liquid material to movement within the cavity. In an embodiment, the movement of conductive liquid material within the cavity or outer barrier is inferred from changes in the electrical interaction of interacting pairs of conductors.

In an embodiment, the first conductor 11 is made of a conductive flexible material. In an embodiment, the first conductor 11 is made from conductive rubber. In an embodiment, the first conductor 11 comprises conductive rubber. In an embodiment, the conductive rubber is a rubber material with metal particles contained within the rubber material. In an embodiment, flexible conductors are formed from conductive rubber in thread-like structures. In an embodiment, the conductive rubber can be placed within a sensor structure 10 that is a non-conductive silicone. In an embodiment, first conductors 11 made of conductive rubber are arranged within the sensor structure 10. In an embodiment, first conductors 11 made of conductive rubber are molded within the sensor structure 10. In an embodiment, first conductors 11 made of conductive rubber are inserted within the sensor structure 10. In an embodiment, first conductors 11 made of conductive rubber are sewn into the sensor structure 10.

Still referring to FIG. 1, the first conductor 11 is shown having a cylindrical shape. Each first conductor 11 may have shapes other than a cylindrical shape and several first conductors 11 may have shapes that differ from one-another within the same sensor structure 10. In an embodiment, conductors are formed as three-dimensional objects (or the faces of such three-dimensional objects), examples of which include: cubes, rectangular prisms, triangular prisms, octagonal prisms, tetrahedrons, pyramids, square pyramids and cones. In an embodiment, interleaving flexible conductors and other conductors in two or more dimensions is possible. For example, 2 mm cubes could be placed, e.g., 2 mms apart in a two dimensional grid within a sensor structure 10 that is, e.g. 1" wide and worn on the wrist, while another layer of similar cubes could be deployed within the sensor structure 10 that is ½" wide, and which circumscribes the first array, but is affixed so that it generally covers only the center ½" of the second structure. In an embodiment, an array of e.g., alternating first conductors 11 and second conductors 12 can be employed.

In FIG. 1, the second conductors 12 are illustrated as being generally rectangular in shape. In an embodiment, the second conductors 12 function as transmitters. In an embodiment, the second conductors 12 function as receivers. The second conductors 12 are operably connected to the IC 100. In an embodiment, second conductors 12 are made of a solid conductive material. In an embodiment, second conductors 12 are made of a flexible conductive material and first conductors 11 are made of a flexible conductive material. In an embodiment, the first conductors 11 and the second conductors 12 are placed in an alternating arrangement so that a second conductor 12 is located between and adjacent to two first conductors 11 and/or a first conductor 11 is located between and adjacent to two second conductors 12. This arrangement can be repeated. In an embodiment, the second conductors 12 are located within the sensor structure 10 at a location that has a stiffness different than the stiffness of the sensor structure 10 where the first conductors 11 are located. In an embodiment, the locations within the sensor structure 10 that are of different stiffness may be within the same plane. In an embodiment, the locations within the sensor structure 10 may be at different layers within the sensor structure 10. "Stiffness," generally, is a property of the displacement produced by a force along the same degree of freedom, e.g., the change in length of stretched spring. In the international system of units this property is typically measured in newton per meter.

Still referring to FIG. 1, in an embodiment, the integrated circuit 100 is a mixed signal integrated circuit and is adapted to generate one or more signals and send the signals to the first conductors 11 via connection 101. In an embodiment, a mixed signal integrated circuit is adapted to generate one or more signals and send the signals to at least one of the first conductors 11 and the second conductors via connection 101. In an embodiment, the mixed signal integrated circuit 100 is adapted to generate a plurality of frequency-orthogonal signals and send the plurality of frequency-orthogonal signals, respectively, to a plurality of conductors selected from the plurality of the first conductors 11 and the plurality of second conductors 12. In an embodiment, the mixed signal integrated circuit 100 is adapted to generate a plurality of frequency-orthogonal signals and send at least one of the plurality of frequency-orthogonal signals, respectively, to each of a plurality of conductors selected from the plurality of the first conductors 11 and the plurality of second conductors 12.

In an embodiment, the frequency-orthogonal signals are in the range from DC up to about 2.5 GHz. In an embodiment, the frequency-orthogonal signals are in the range from DC up to about 1.6 MHz. In an embodiment, the frequency-orthogonal signals are in the range from 50 kHz to 500 kHz. In an embodiment, the frequency-orthogonal signals are in the range from 50 kHz to 200 kHz. In an embodiment, the integrated circuit samples received signals at a rate of between 500 kHz and 10 MHz. In an embodiment, the integrated circuit samples the received signals at a rate of between 1 and 5 MHz. In an embodiment, the integrated circuit samples the received signals at a rate of between 2 and 5 MHz. In an embodiment, the integrated circuit samples the received signals at a rate of approximately 4 MHz. In an embodiment, received signals are sampled at more than 4 MHz. In an embodiment, the integrated circuit samples the received signals at a rate of 4.096 MHz.

In an embodiment, the integrated circuit samples the received signals for an integration period. In an embodiment, the integration period is selected to provide a sufficient number of samples from which to identify the frequency-orthogonal signals. In an embodiment, the integration period is selected so that the number of samples is a power of 2, e.g., 1024 or 2048 or 4096 samples. In an embodiment, an integration period is selected in the range of between 10 milliseconds and 0.1 milliseconds. In an embodiment, an integration period is selected in the range of between 2 milliseconds and 0.5 milliseconds. In an embodiment, an integration period is 1 millisecond.

In an embodiment, the frequency spacing between frequency-orthogonal signals is equal to the reciprocal of the integration period. In an embodiment, the frequency spacing between frequency-orthogonal signals is an integer multiple of the reciprocal of the integration period. In an embodiment, the minimum frequency spacing between frequency-orthogonal signals at least the reciprocal of the integration period.

In an exemplary embodiment, a sample rate of 4.096 MHz is used with an 4096 samples and an integration period of 1 millisecond, and employing orthogonal frequencies having a frequency spacing therebetween of 1 kHz. In an exemplary embodiment, a sample rate of 4.096 MHz is used with an 4096 samples and an integration period of 1 millisecond, and employing orthogonal frequencies having a frequency spacing therebetween of 2 kHz. In an exemplary embodiment, a sample rate of 2.048 MHz is used with an 2048 samples and an integration period of 1 millisecond, and employing orthogonal frequencies having a frequency spacing therebetween of 1 kHz. In an exemplary embodiment, a sample rate of 4.096 MHz is used with an 1024 samples and an integration period of 250 microseconds, and employing orthogonal frequencies having a frequency spacing therebetween of 4 kHz. In an exemplary embodiment, a sample rate of 4.096 MHz is used with an 1024 samples and an integration period of 250 microseconds, and employing orthogonal frequencies having a frequency spacing therebetween of 12 kHz. The relationship between sampling rate, integration period and frequency spacing may be varied in numerous ways that will be apparent to a person of ordinary skill in the art in view of this disclosure without departing from the spirit and scope of this disclosure and the novel sensors described herein.

In an embodiment, the mixed signal integrated circuit 100 (or a downstream component or software) is adapted to determine at least one value representing each frequency orthogonal signal transmitted by a first conductor 11. In an embodiment, the mixed signal integrated circuit 100 (or a downstream component or software) performs a Fourier transform received signals. In an embodiment, the mixed signal integrated circuit 100 is adapted to digitize received signals. In an embodiment, the mixed signal integrated circuit 100 (or a downstream component or software) is adapted to digitize received signals and perform a discrete Fourier transform (DFT) on the digitized information. In an embodiment, the mixed signal integrated circuit 100 (or a downstream component or software) is adapted to digitize received signals and perform a Fast Fourier transform (FFT) on the digitized information.

To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 kHz. In an embodiment, the frequency spacing is equal to the reciprocal of the integration period. (It will be apparent to one of skill in the art in view of this disclosure that taking 4096 samples at e.g., 4 MHz would yield an integration period slightly longer than a millisecond, and not achieving kHz sampling, and a minimum frequency spacing of 976.5625 Hz.) In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, an FFT is used to transform the digitized received signals into bins of information, each reflecting the frequency of a frequency-orthogonal signal transmitted which may have been transmitted by the first conductor 11. In an embodiment 4096 bins correspond to frequencies from 1 kHz to about 4 MHz. It will be apparent to a person of skill in the art in view of this disclosure that these examples are simply that, exemplary. Depending on the needs of a system, and subject to the constraints described above, the sample rate may be increased or decrease, the integration period may be adjusted, the frequency range may be adjusted, etc.

Using the mixed signal integrated circuit 100 described above, or another system that can transmit and receive signals, and make measurements corresponding to the changes in the electrical interaction of interacting pairs of conductors, information can be derived about deformation of the sensor structure 10 or the first conductors 11. In an embodiment, information can be derived about a body part on which such a sensor system is worn. In an embodiment, information can be derived about how an object comprising such a sensor system is being touched or deformed. In an embodiment, information can be derived about forces acting on a system comprising such a sensor system.

In an exemplary wrist band embodiment, information about hand and wrist motion can be ascertained. In an embodiment, each transmitting first conductor 11 can be used to transmit a plurality of frequency-orthogonal signals. In an embodiment, operation of the first conductors 11 and second conductors 12 can be dynamically re-configured, allowing each of the first conductors 11 and second conductors 12 to operate as either a transmitter or a receiver (or ground) during any integration period. In an embodiment, a first conductor 11 (or second conductor 12) can be used as both a transmitter and a receiver (albeit of different frequency-orthogonal signals) during a single integration period. In an embodiment, two groups of first conductors 11

(or second conductors 12) are used as both transmitters and receivers during the same integration period; the first group of first conductors 11 (or second conductors 12) has its received signals passed through a high pass filter and are used to transmit only low frequencies, while the second group of first conductors 11 (or second conductors 12) has its received signals passed through a low pass filter and transmit only high frequencies.

In an embodiment, the sensor structure 10 of FIG. 1 is deployed in close proximity to a user's skin. As the user moves, deformation of the flexible conductors 11 are reflected in the signal interactions between the conductor pairs. In an embodiment, the deformations or deformation events are quantified by the mixed signal integrated circuit 100 or downstream circuits or software.

In an embodiment, minute deformations are determined based on changes in the shape of a first conductor 11, and thus the first conductor's 11 position and/or orientation with respect to one or more second conductors 12 are reflected in the signals received by the receiver and used to determine a measurement (e.g., magnitude and/or phase). The signal can be quantified by the mixed signal integrated circuit 100 or downstream circuits or software.

In an embodiment, signal measurements are used to quantify deformations in the flexible conductors 11. In an embodiment, signal measurements are used to determine a position or motion of a body part such as a wrist. In an embodiment, signal measurements are used to determine a position or motion of a body part such as the articulation of the bones, joints, tendons and muscles. In an embodiment, signal measurements are used to determine a position or motion of a body part such as the articulation of the bones, joints and muscles of the wrist area. In an embodiment, signal measurements are used to determine the position and/or movement of a hand, wrist, foot, ankle, head, neck, torso, arm, shoulder, or any other body part, or a portion of a body part. In an embodiment, signal measurements are used to determine elastic movement of skin in relation to a body or body part. In an embodiment, signal measurements can be used to determine the vibration and movement of vocal cords. In an embodiment, signal measurements are used to deduce sounds or speech from the vibration and movement of vocal cords. In an embodiment, signal measurements are used to determine respiration, heart activity, pulse or other biomechanical changes. In an embodiment, signal measurements are used to determine the magnitude of hand motion. In an embodiment, the change in signal is used to determine a direction of the hand motion. In an embodiment, the signal measurements are used in combination with a constrained model of the hand and skin to determine the motion of the hand. In an embodiment, signal measurements are used in combination with a constrained model of the hand and skin to translate the motion into an VR/AR system.

In an embodiment, the first conductors 11 and second conductors 12 may be part of an conductor array including one or more first conductors 11 and one or more second conductors 12. In an embodiment, more conductors will lead to a better determination and measurement of the movements reflected by deformation and deformation events. The placement of conductors and the nature of the conductors so that they move relative to each other as a result of the body movement that is desired to be measured, and not quantity alone, will lead to improved capability for measurement. In an embodiment, conductors are placed in key locations on or proximate to a body part so that measured deformations can be used to determine information regarding the body part. By "proximate" it is generally meant close enough that the conductors are able to provide information regarding the movement of the body part, for example on the wrist area to provide information regarding a hand posture or position. In an embodiment, conductors of an array are placed at specific locations on the wrist area where articulation or the stretching of skin occurs, or on the wrist and forearm areas where tendon movement is more apparent at the skin surface. In an embodiment, conductors (or conductor groups) are placed on or proximate to the skin, and the stretching of the skin and movement of subdermal structures causes the relative orientation of the conductors to shift and deformation of at least some of the conductors, and the consequential signal changes can be used to understand the stretching and movement.

In an embodiment, machine learning algorithms are used to associate movement with consequential signal changes, and then to model movement based on such consequential signal changes. In an embodiment, (1) a sensor system comprising flexible conductors is positioned for use; (2) a plurality of measurements are taken via the sensor system and simultaneous via a relative ground truth means such as by a camera; (3) a machine learning algorithm is used to associate sensor measurements with sensor events; and (4) later events are inferred based upon sensor measurements. For example, a sensor system comprising flexible conductors may be worn as a wristband; in view of one or more cameras to operate as ground truth, the hand is placed in a series of poses; a machine learning algorithm then uses the captured sensor and camera data to associate hand poses or movements with sensor readings; and finally, hand poses are inferred based on sensor readings. In another example, a sensor system comprising flexible conductors is embedded within a car seat; in view of one or more cameras or other sensors to operate as ground truth, the car seat is used in a variety of ways by a number of occupants, e.g., sitting, slouching, entering, exiting, braking, accelerating, etc.; a machine learning algorithm then uses the captured sensor and camera and/or other data to associate occupant use with sensor readings; and finally, occupant use is inferred based upon sensor readings.

Figure 2:
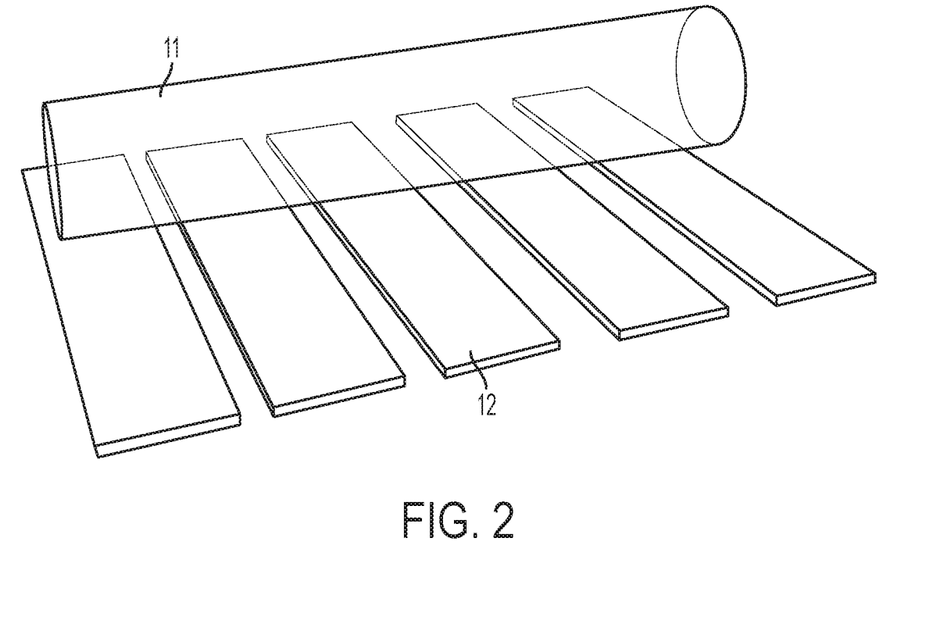
FIG. 2 shows a schematic diagram of a sensor structure that has a deformable conductor.

Turning to FIG. 2, shown is a first conductor 11 located proximate to a plurality of second conductors 12. The first conductor 11 is oriented so that it extends in a lengthwise direction that is perpendicular to the lengthwise direction of the plurality of second conductors 12. As discussed above, the orientation of the first conductors 11 with respect the second conductors 12 may vary and many different configurations will be apparent to a person of skill in the art in view of this disclosure. Likewise, the transmitting and receiving (and ground) roles of the first conductor 11 and the second conductors 12 may alternate or be reversed. In an embodiment, the sensor structure 10 may form a wristband with the first conductor 11 extending throughout a majority of the sensor structure 10 in the lengthwise direction. In an embodiment, the first conductor 11 extends only a portion of the way around the sensor structure 10 and is one of a plurality of first conductors 11 that extends a portion of the way around the sensor structure 10. In an embodiment, the first conductor 11 extends only a portion of the way around the sensor structure 10 and is one of a plurality of first conductors 11 that extends a portion of the way around the sensor structure 10 at different planar levels.

In an embodiment, the first conductor 11 comprises a conductive fluid bounded or contained e.g., by an outer sleeve or barrier, or by the sensor structure 10 itself. In an embodiment, the first conductor 11 comprises a conductive elastomeric material within or upon the sensor structure 10 itself. In an embodiment, deformations of the first conductor 11 are inferred by signal measurements reflecting the electrical interaction between the first conductors 11 and second conductors 12. In an embodiment, the measurements are used to model and determine movement, position and/or other characteristics of body parts. In an embodiment, the measurements are used to model and determine movement, position and/or other characteristics of objects in which the sensors are located.

Figure 3:
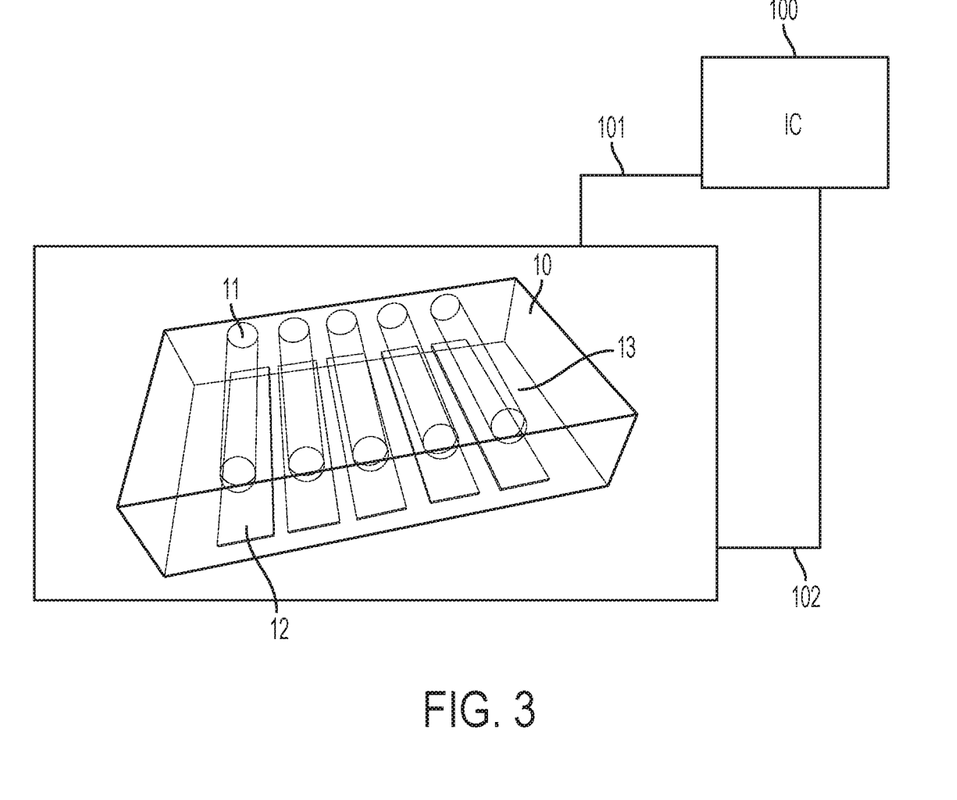
FIG. 3 shows a schematic diagram of a sensor structure that has deformable conductors.

Turning to FIG. 3, another sensor embodiment is shown. A plurality of first conductors 11 are oriented proximate to a plurality of second conductors 12 within a sensor structure 10. The first conductors 11 are oriented so that the first conductors 11 extend in a lengthwise direction that is parallel to the direction the plurality of second conductors 12 extend in the lengthwise direction. As discussed above, the orientation of the first conductors 11 with respect the second conductors 12 may vary and many different configurations will be apparent to a person of skill in the art in view of this disclosure. Likewise, the transmitting and receiving roles of the first conductors 11 and the second conductors 12 may alternate or be reversed.

Figure 4:
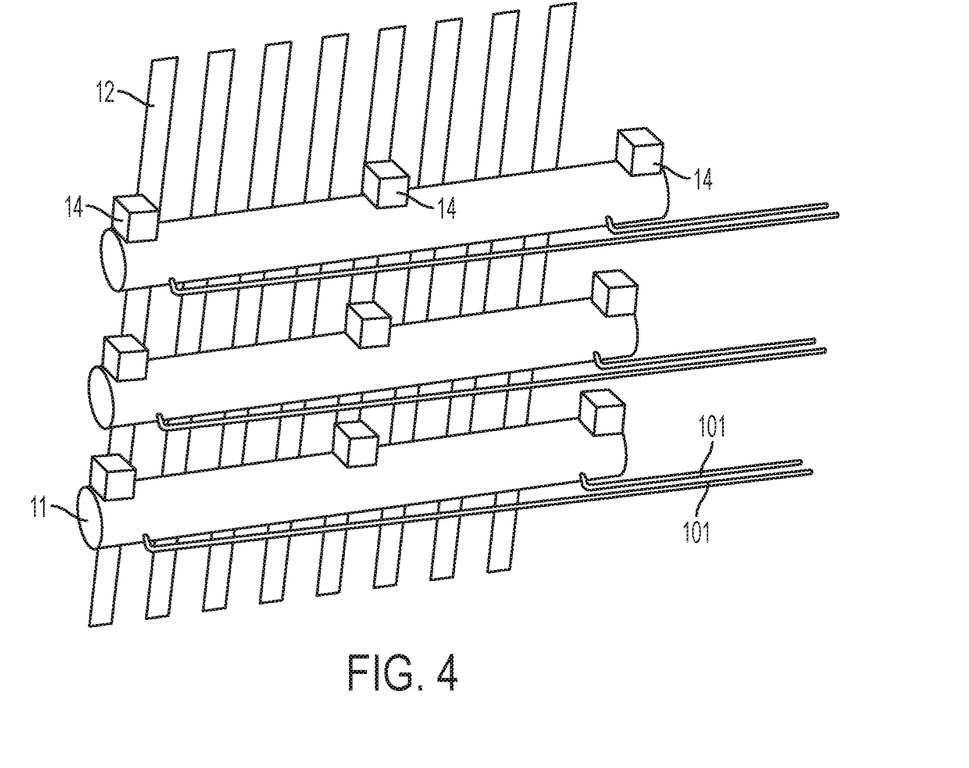
FIG. 4 shows a schematic diagram of a sensor structure having deformable structures and magnetic components.

Turning to FIG. 4, yet another sensor embodiment is illustrated. A plurality of flexible conductors 11 is located proximate to a plurality of second conductors 12. The flexible conductors 11 are oriented so that they extend in a lengthwise direction that is perpendicular to the lengthwise direction of the plurality of second conductors 12. As discussed above, the orientation of the first conductors 11 with respect the second conductors 12 may vary and many different configurations will be apparent to a person of skill in the art in view of this disclosure. Likewise, the transmitting and receiving roles of the first conductors 11 and the second conductors 12 may alternate or be reversed.

Still referring to FIG. 4, the first conductors 11 are formed in cavities 13 at least partially filled with a conductive liquid material. The cavities may be defined by a sleeve around the first conductors 11 or by a cavity in a bounding sensor structure (not shown). In an embodiment, the cavities 13 are not completely filled with the conductive liquid material so as to permit the movement of the conductive liquid material within the cavities 13. In an embodiment, another fluid (being substantially non-conductive, immiscible with the conductive liquid material) is also present within the cavity. In an embodiment, the conductive liquid material is a conductive magnofluid material and the another fluid is non-magnetic. Each of the first conductors 11 has one or more magnetic components 14 mounted thereon. In an embodiment, the electromagnetic component 14 is embedded in the sensor structure 10. In an embodiment, the electromagnetic component 14 is formed adjacent the cavity 13. In an embodiment, the electromagnetic component 14 is embedded in the sensor structure (not shown) proximate to one or more first conductors 11.

In FIG. 4, the first conductor 11 has three electromagnetic components 14 mounted thereon, one in the center and two at each of the distal ends of the first conductor 11. In an embodiment, there are more than three electro-magnetic components 14 per each of the first conductors 11. In an embodiment, there are less than three electromagnetic components 14 per each of the first conductors 11. In an embodiment, there is only one electromagnetic component 14 per each of the first conductors 11. In an embodiment, there is one electromagnetic component 14 for each pair of first conductors 11. In an embodiment, the electromagnetic components 14 can be activated selectively, and in this manner, the shape of the first conductor 11 can be influenced by the selectively activated electromagnetic components 14.

In an embodiment, multiple connections 101 extend to various locations on each first conductor and operably connect the first conductor 11 to a receiver or transmitter which may be part of a mixed signal integrated circuit. In an embodiment, selective activation of the electromagnetic components 14 can urge movement of the conductive magnofluid material within the cavity 13. For example, activation of the two outer electromagnetic components 14 can be used to cause the conductive magnofluid material to separate to the two ends, where they act as separate antennas, each connected to separate connections 101. In an embodiment, each of the separate connections can be associated with a transmitter, a receiver or ground.

In an embodiment, during use of the sensor system, the magnetic components 14 can be selectively activated in order to affect the magnetic conductive liquid material in the cavity 13 of the first conductor 11. In an embodiment, the electromagnetic components 14 at an end of the first conductor 11 is activated to draw the conductive magnofluid material to the distal end of the first conductor 11. The electromagnetic component 14 in the center of the first conductor 11 can be used to draw the conductive magnofluid material towards the center of the first conductor 11. Selectively activating the electromagnetic components 14 during the transmission of different signals through (or the receiving of different signals via) the connection 101 can provide more detail and data during deformation. In an embodiment, when the shape of the cavity 13 is deformed, multiple measurements (taken during different integration periods) with the electromagnetic components 14 variously activated can be compared to aid in the analysis of the cavity 13 deformation.

Figure 5:
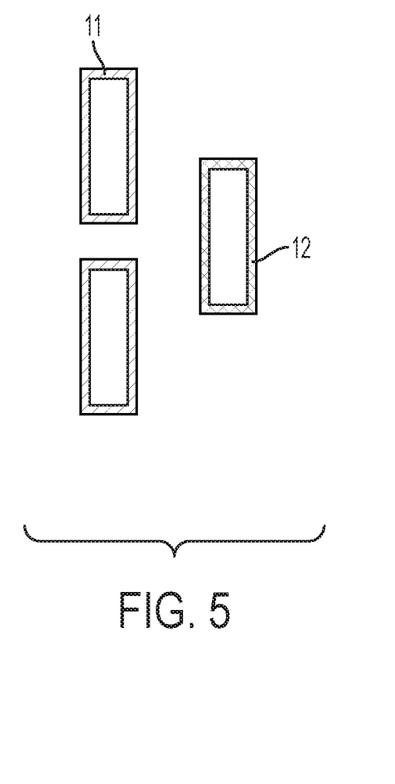
FIG. 5 shows a diagram of an embodiment of an arrangement of conductors arranged in a linear pattern.

FIG. 5 shows a schematic high-level diagram of an embodiment where conductors are arranged in linear patterns. The conductors are offset from each other so that two of the first conductors 11 extend over the second conductors 12 and vice-versa.

Figure 6:
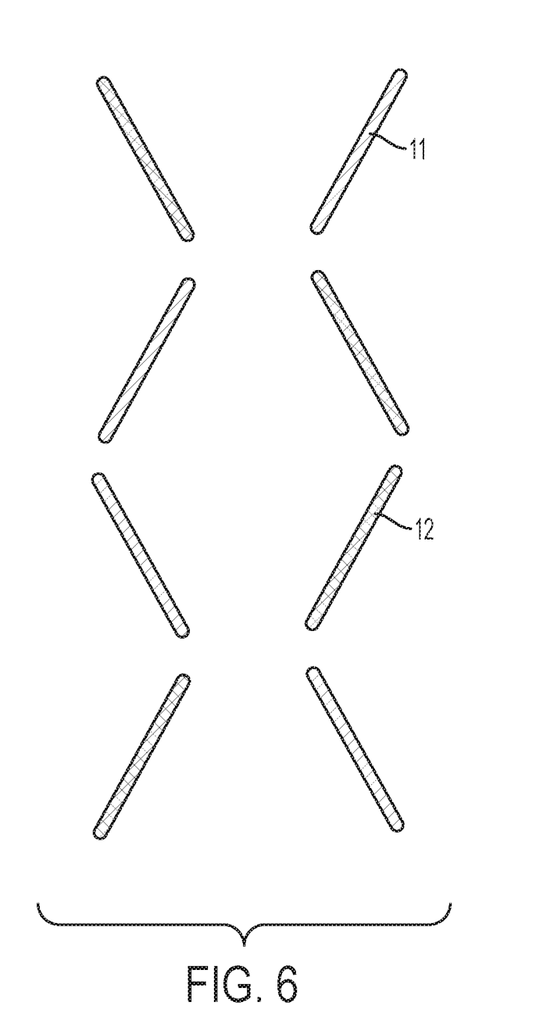
FIG. 6 shows a diagram of an embodiment of an arrangement of conductors arranged in an opposing saw-tooth pattern.

FIG. 6 shows a schematic high-level diagram of an embodiment where conductors are arranged in an opposing saw-tooth pattern. The first conductors 11 are angled in opposite directions from the angling of the second conductors 12.

Figure 7:
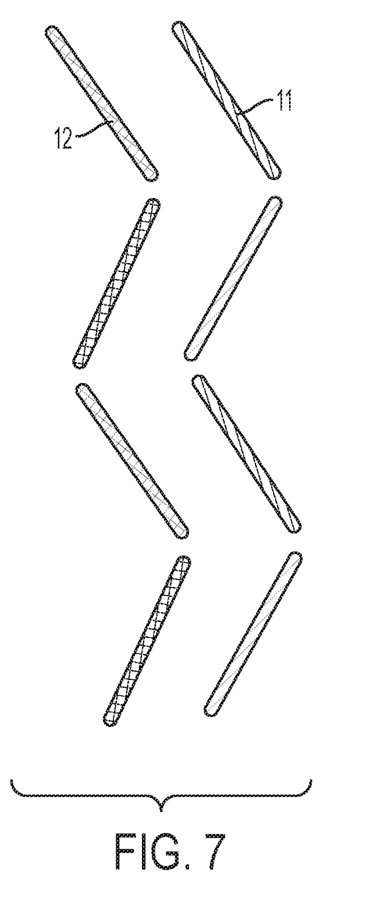
FIG. 7 shows a diagram of an embodiment of an arrangement of conductors arranged in complementary saw-tooth pattern.

FIG. 7 shows a schematic high-level diagram of an embodiment where conductors are arranged in complementary saw-tooth pattern. The first conductors 11 are angled in the same direction as the angling of the second conductors 12.

Figure 8:
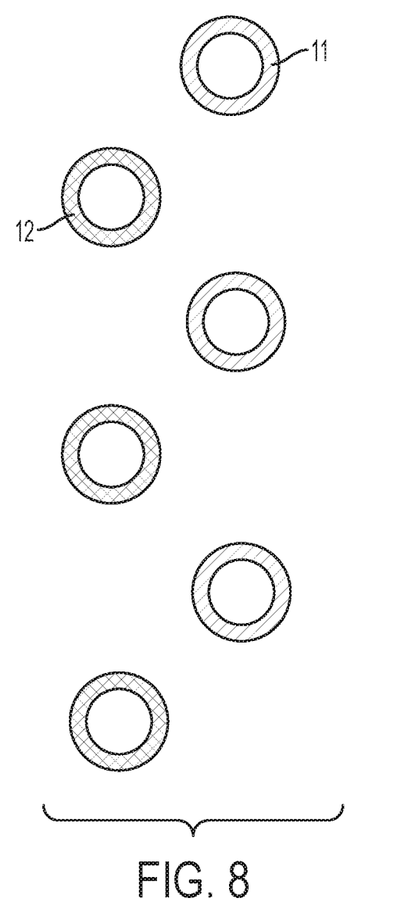
FIG. 8 shows a diagram of an embodiment of an arrangement of conductors arranged in a pattern where the ends of the conductors are extending out of the page.

FIG. 8 shows a schematic high-level diagram of an embodiment where cylindrical conductors are arranged in an alternating pattern. In addition to this orientation it is possible to orient conductors in a variety of orientations with respect to the surface of a band or other wearable.

Figure 9:
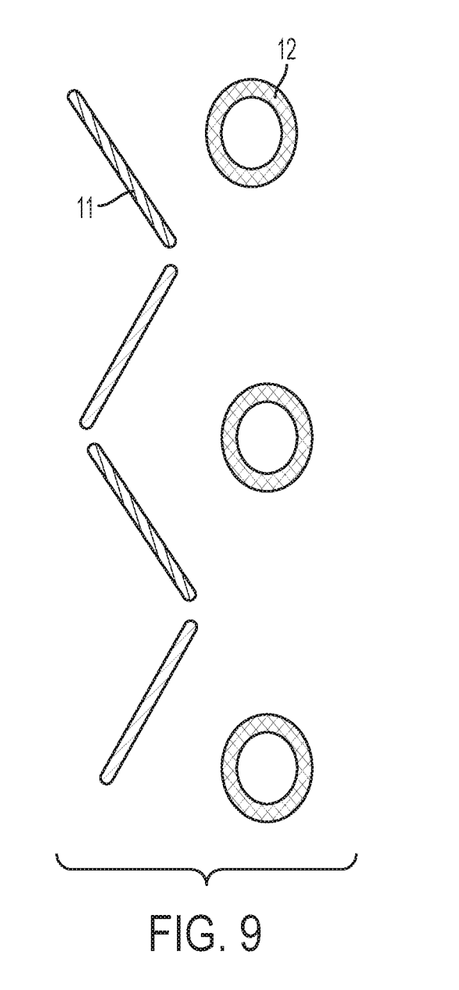
FIG. 9 shows a diagram of an embodiment of an arrangement of conductors where the conductors are arranged in a saw-tooth pattern and the conductors are extending out of the page.

FIG. 9 shows a schematic high-level diagram of an embodiment where non-homogenous conductors are arranged in proximity to each other. In an embodiment, conductors are able to interact and detect a variety of movements in the x, y and z axis, as well as potentially detecting pitch, yaw and roll.

In an embodiment, very small transmit and receive conductors are positioned directly on a variety of nearby locations (on the body or on the sensing object), and can detect relative movement to one another and deformation that occurs with respect to the deformable conductors. The relative movement and deformations can be used to infer movement or positions of nearby body parts or forces. In an embodiment the deformable conductors can be encapsulated conductive liquid material.

In an embodiment, the apparatus is a flexible conductor adapted to deform as a result of an external force; a second conductor, the flexible conductor and the second conductor are operatively coupled to drive and sense circuitry, the drive and sense circuitry being adapted to cause the flexible conductor and the second conductor to form an interacting pair of conductors, and to measure the interactions between the interacting pair of conductors during a plurality of integration periods; and circuitry for inferring a deformation of the flexible conductor based upon the measurements during a plurality of integration periods. In an embodiment, the flexible conductor comprises conductive magnofluid material. In an embodiment, the conductive magnofluid material is selected from the group consisting of: ferrofluid, gallium and gallium alloy. In an embodiment, the flexible conductor comprises a material that is both flexible and conductive. In an embodiment, flexible conductive material comprises conductive rubber. In an embodiment, a switchable electromagnetic component is located proximate to the flexible conductor. In an embodiment, the flexible conductor is one of a plurality of flexible conductors and the plurality of flexible conductors extend in a lengthwise direction perpendicularly to a direction the second conductor extends in a lengthwise direction. In an embodiment, the measurements corresponding to the plurality of integration periods reflect deformation of the flexible conductor adapted to be deformed by a force external to the apparatus. In an embodiment, the second antenna is also adapted to deform as a result of an external force.

In an embodiment, a method comprises the steps of: generating a plurality of frequency-orthogonal signals on each of a plurality of first conductors, respectively, wherein at least one of the plurality of first conductors is adapted to be mechanically deformed; receiving signals on a plurality of second conductors, the plurality of second conductors being oriented such that each of the plurality of first conductors forms an interacting pair of conductors with at least one of the plurality of second conductors; processing the received signals received during an integration period to determine a measurement corresponding to each of the plurality of frequency-orthogonal signals for each of the received signals; and determining a mechanical deformation for at least one of the plurality of first conductors based at least in part on the measurements. In an embodiment, the at least one of the plurality of first conductors comprises conductive magnofluid material. In an embodiment, the at least one of the plurality of first conductors comprises conductive rubber. In an embodiment, at least one electromagnetic component is located proximate to at least one of the first plurality of first conductors. In an embodiment, at least one of the plurality of first conductors has a first end and a second end, a first electromagnetic component is located proximate to the first end, a second electromagnetic component is located proximate to the second end, the method further comprising activating the first electromagnetic component, thereby changing the shape of the magnofluid material. In an embodiment, at least one of the plurality of first conductors has a first end and a second end, a first electromagnetic component is located proximate to the first end, a second electromagnetic component is located proximate to the second end, the method further comprising activating the first and second electromagnetic components, thereby separating the first conductor into two separate conductors that are not in ohmic contact with one-another. In an embodiment, inferring movement of a body part is based at least in part on the determined mechanical deformation. In an embodiment, the measurements for the determined mechanical deformation for at least one of the plurality of first conductors are taken simultaneously via a relative ground truth means; a machine learning algorithm is applied to associate the measurements with body movements; and additional body movements are inferred based on data from the machine learning algorithm.

In an embodiment, an apparatus comprises a sensor structure; a first conductor located within the sensor structure, the first conductor adapted to be deformed by movement of a body part; at least one second conductor located within the sensor structure; and an integrated circuit operably connected to the at least one first conductor and the least one second conductor, wherein the integrated circuit is adapted to determine deformation of the first conductor, and determine movement of a body part based on the determined deformation. In an embodiment at least one first conductor comprises a conductive magnofluid material. In an embodiment, at least one of the plurality of first conductors comprises conductive rubber.

It is understood programs and processes discussed herein may be implemented by means of analog or digital hardware and computer program instructions. Computer program instructions may be provided to a processor of a general purpose computer, special purpose computer, ASIC, or other programmable data processing apparatus, such that the instructions, which execute via a processor of a computer or other programmable data processing apparatus, implements the functions/acts specified in the block diagrams or operational block or blocks.

Many different configurations will be apparent to a person of skill in the art in view of this disclosure.

While the invention has been particularly shown and described with reference to embodiments thereof, it will be understood by those skilled in the art that various changes in form and details may be made therein without departing from the spirit and scope of the invention.

What is claimed is:

1. A method comprising the steps of:
   generating a plurality of frequency-orthogonal signals on each of a plurality of first conductors, respectively, wherein at least one of the plurality of first conductors is adapted to be mechanically deformed;
   receiving signals on a plurality of second conductors, the plurality of second conductors being oriented such that each of the plurality of first conductors forms an interacting pair of conductors with at least one of the plurality of second conductors;
   processing the received signals received during an integration period to determine a measurement corresponding to each of the plurality of frequency-orthogonal signals for each of the received signals; and
   determining a mechanical deformation for at least one of the plurality of first conductors based at least in part on the measurements.

2. The method of claim 1, wherein the at least one of the plurality of first conductors comprises conductive magnofluid material.

3. The method of claim 2, wherein
   at least one of the plurality of first conductors has a first end and a second end,
   a first electromagnetic component is located proximate to the first end,
   a second electromagnetic component is located proximate to the second end, the method further comprising:

activating the first electromagnetic component, thereby changing the shape of the magnofluid material.

4. The method of claim 2, wherein at least one of the plurality of first conductors has a first end and a second end, a first electromagnetic component is located proximate to the first end, a second electromagnetic component is located proximate to the second end, the method further comprising:

activating the first and second electromagnetic components, thereby separating the first conductor into two separate conductors that are not in ohmic contact with one-another.

5. The method of claim 1, wherein the at least one of the plurality of first conductors comprises conductive rubber.

6. The method of claim 1, wherein at least one electromagnetic component is located proximate to at least one of the first plurality of first conductors.

7. The method of claim 1, inferring movement of a body part based at least in part on the determined mechanical deformation.

8. The apparatus of claim 7, wherein the at least one first conductor comprises a conductive magnofluid material.

9. The method of claim 1, wherein the measurements for the determined mechanical deformation for at least one of the plurality of first conductors are taken simultaneously via a relative ground truth means;

applying a machine learning algorithm to associate the measurements with body movements; and inferring additional body movements based on data from the machine learning algorithm.

10. The apparatus of claim 9, wherein the at least one of the plurality of first conductors comprises conductive rubber.

* * * * *